United States Patent
Douglas (10) Patent No.: US 11,449,324 B2
(45) Date of Patent: Sep. 20, 2022

(54) AUTOMATIC UPDATING OF AN APPLICATION EXECUTING ON AN APPLICATION SERVER

(71) Applicant: Red Hat, Inc., Raleigh, NC (US)

(72) Inventor: Stuart W. Douglas, Orange (AU)

(73) Assignee: Red Hat, Inc., Raleigh, NC (US)

( * ) Notice: Subject to any disclaimer, the term of this patent is extended or adjusted under 35 U.S.C. 154(b) by 521 days.

(21) Appl. No.: 16/036,257

(22) Filed: Jul. 16, 2018

(65) Prior Publication Data
US 2020/0019398 A1  Jan. 16, 2020

(51) Int. Cl.
| | |
|---|---|
| *G06F 8/65* | (2018.01) |
| *G06F 9/445* | (2018.01) |
| *G06F 8/70* | (2018.01) |
| *H04L 67/00* | (2022.01) |
| *H04L 9/40* | (2022.01) |
| *H04L 67/51* | (2022.01) |
| *H04L 67/60* | (2022.01) |

(52) U.S. Cl.
CPC ............ *G06F 8/65* (2013.01); *G06F 8/70* (2013.01); *G06F 9/44521* (2013.01); *H04L 63/08* (2013.01); *H04L 67/34* (2013.01); *H04L 67/51* (2022.05); *H04L 67/60* (2022.05)

(58) Field of Classification Search
CPC .......... G06F 8/65; G06F 8/70; G06F 9/44521; H04L 67/51; H04L 67/60; H04L 67/34; H04L 63/08
USPC ........................................................ 717/168
See application file for complete search history.

(56) References Cited

U.S. PATENT DOCUMENTS

| | | | | |
|---|---|---|---|---|
| 6,353,928 | B1 * | 3/2002 | Altberg | G06F 8/61 717/175 |
| 8,019,835 | B2 * | 9/2011 | Suorsa | G06F 8/61 709/217 |
| 8,645,938 | B2 | 2/2014 | O'Farrell et al. | |
| 8,806,469 | B2 | 8/2014 | Jones et al. | |
| 9,141,415 | B2 | 9/2015 | Rasmussen et al. | |
| 9,253,265 | B2 | 2/2016 | Kuppala et al. | |
| 9,720,654 | B2 | 8/2017 | Cai et al. | |
| 2010/0071033 | A1 * | 3/2010 | Umezawa | H04L 63/0823 726/3 |

(Continued)

OTHER PUBLICATIONS

Author Unknown, "Configuring Undertow Filters on WildFly," Mastertheboss, WildFly Jboss Application Server Tutorials, Available online at: <<http://www.mastertheboss.com/jboss-web/jbosswebserver/configuring-undertow-filters-on-wildfly>>, Accessed Jul. 16, 2018, 5 pages.

Author Unknown, "Fakereplace Class Reloader," GitHub, Inc., Available online at: <<https://github.com/fakereplace/fakereplace>>, Accessed Jul. 16, 2018, 3 pages.

(Continued)

*Primary Examiner* — Chat C Do
*Assistant Examiner* — Bradford F Wheaton
(74) *Attorney, Agent, or Firm* — Dority & Manning, P.A.

(57) ABSTRACT

Automatic updating of an application executing on an application server is disclosed. A remote agent receives, from a request processor, an indication that a request for service has been received, the request for service being directed toward an application executing on an application server. The remote agent receives, from a local agent associated with a development environment, a file associated with the application. The remote agent updates the application to utilize the file and informs the request processor that the application may receive the request for service.

20 Claims, 6 Drawing Sheets

(56) References Cited

U.S. PATENT DOCUMENTS

| | | | | |
|---|---|---|---|---|
| 2012/0102479 | A1* | 4/2012 | Smith | G06F 8/65 717/171 |
| 2012/0246630 | A1* | 9/2012 | Kuzins | G06F 8/61 717/169 |
| 2013/0268864 | A1* | 10/2013 | Gomilko | H04L 67/32 715/748 |
| 2014/0201820 | A1* | 7/2014 | Li | H04L 63/08 726/4 |
| 2014/0245275 | A1* | 8/2014 | Elias | G06F 8/656 717/168 |
| 2016/0004528 | A1* | 1/2016 | Price | G06F 8/65 717/173 |
| 2016/0019044 | A1* | 1/2016 | Stolarchuk | G06F 8/65 717/171 |
| 2016/0098261 | A1* | 4/2016 | Habib | G06F 9/454 717/171 |
| 2016/0170739 | A1 | 6/2016 | Kapashikov et al. | |

OTHER PUBLICATIONS

Author Unknown, "Welcome to Spring-Loaded," GitHub, Inc., Available online at: <<https://github.com/spring-projects/spring-loaded>>, Accessed Jul. 16, 2018, 3 pages.

Author Unknown, "Configuring a Custom Undertow Filter in WildFly," NovaOrdis Knowledge Base, Available online at: <<https://kb.novaordis.com/index.php/Configuring_a_Custom_Undertow_Filter_in_WildFly>>, Last modified Jul. 4, 2018, Accessed Jul. 16, 2018, 4 pages.

Sinha, S., "Debugging the Eclipse IDE for Java Developers," The Eclipse Foundation, Available online at: <<https://www.eclipse.org/community/eclipse_newsletter/2017/june/article1.php>>, Jun. 2017, Accessed Jun. 6, 2018, 11 pages.

Varaskin, O., "Hot Deployment with IntelliJ IDEA," Java Code Geeks, Available online at: >>https://www.javacodegeeks.com/2013/10/hot-deployment-with-intellij-idea.html>>, Oct. 16, 2013, Accessed Jun. 6, 2018, 4 pages.

\* cited by examiner

AUTOMATIC UPDATING OF AN APPLICATION EXECUTING ON AN APPLICATION SERVER

TECHNICAL FIELD

The examples relate generally to application servers and applications executing on application servers, and in particular to automatic updating of an application executing on an application server.

BACKGROUND

Developing and maintaining applications that execute on an application server involves a five cycle process that includes making changes to programming instructions, recompiling the programming instructions, deploying the code to the application server, restarting the application server or the application, and testing the changes.

SUMMARY

The examples implement automatic updating of an application executing on an application server. A remote agent on an application server that receives updated files from a local agent associated with a development environment and automatically, without human involvement, implements the files in an application executing on the application server.

In one example a method is provided. The method includes receiving, by a remote agent, from a request processor, an indication that a request for service has been received, the request for service being directed toward an application executing on an application server. The method further includes receiving, by the remote agent from a local agent associated with a development environment, a file associated with the application. The method further includes updating the application to utilize the file. The method further includes informing the request processor that the application may receive the request for service.

In another example a computing device is provided. The computing device includes a memory, and a processor device coupled to the memory. The processor device is to receive, by a remote agent, from a request processor, an indication that a request for service has been received, the request for service being directed toward an application executing on an application server. The processor device is further to receive, by the remote agent from a local agent associated with a development environment, a file associated with the application. The processor device is further to update the application to utilize the file and inform the request processor that the application may receive the request for service.

In another example a computer program product stored on a non-transitory computer-readable storage medium is provided. The computer program product includes instructions to cause a processor device to receive, by a remote agent, from a request processor, an indication that a request for service has been received, the request for service being directed toward an application executing on an application server. The instructions further cause the processor device to receive, by the remote agent from a local agent associated with a development environment, a file associated with the application. The instructions further cause the processor device to update the application to utilize the file and inform the request processor that the application may receive the request for service.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Developing and maintaining applications that execute on an application server involves a five cycle process that includes making changes to programming instructions, recompiling the programming instructions, deploying the code to the application server, restarting the application server or the application, and testing the changes.

Each iteration of this process takes time and increases the total development or maintenance timeframe. In certain environments, such as a cloud computing environment, the deployment and restarting of the application server or the application may take even longer than in other environments.

The examples disclosed herein greatly reduce the timeframe for development and maintenance of applications that execute on an application server. In particular, the examples implement automatic updating of an application executing on an application server via a process and a mechanism that eliminate manual involvement during the two most time-consuming cycles of the five-cycle development and maintenance process discussed above.

The examples implement a remote agent on an application server that receives updated files from a local agent associated with a development environment and automatically, without human involvement, implements the files in an application executing on the application server. In one example, the application server includes a request processor that processes requests for service that are destined for an application executing on the application server. The request processor, prior to sending a request for service to the application, sends an indication to the remote agent that the request processor has received a request for service directed toward the application. The remote agent then receives, from the local agent at least one file associated with the application. The remote agent updates the application to utilize the file, and then informs the request processor that the application may receive the request for service. The request processor may then send the request for service to the application which then processes the request for service utilizing the updated at least one file.

The examples facilitate an improvement to computer functionality itself via the automatic updating of an application on an application server without a need for human involvement. Among other advantages, this greatly reduces the time frame for software development and/or maintenance, and thus greatly reduces the cost of software development and/or maintenance, as well as expedites the addition of new functionality and/or the resolution of a problem (i.e., a bug) in an application.

Figure 1:
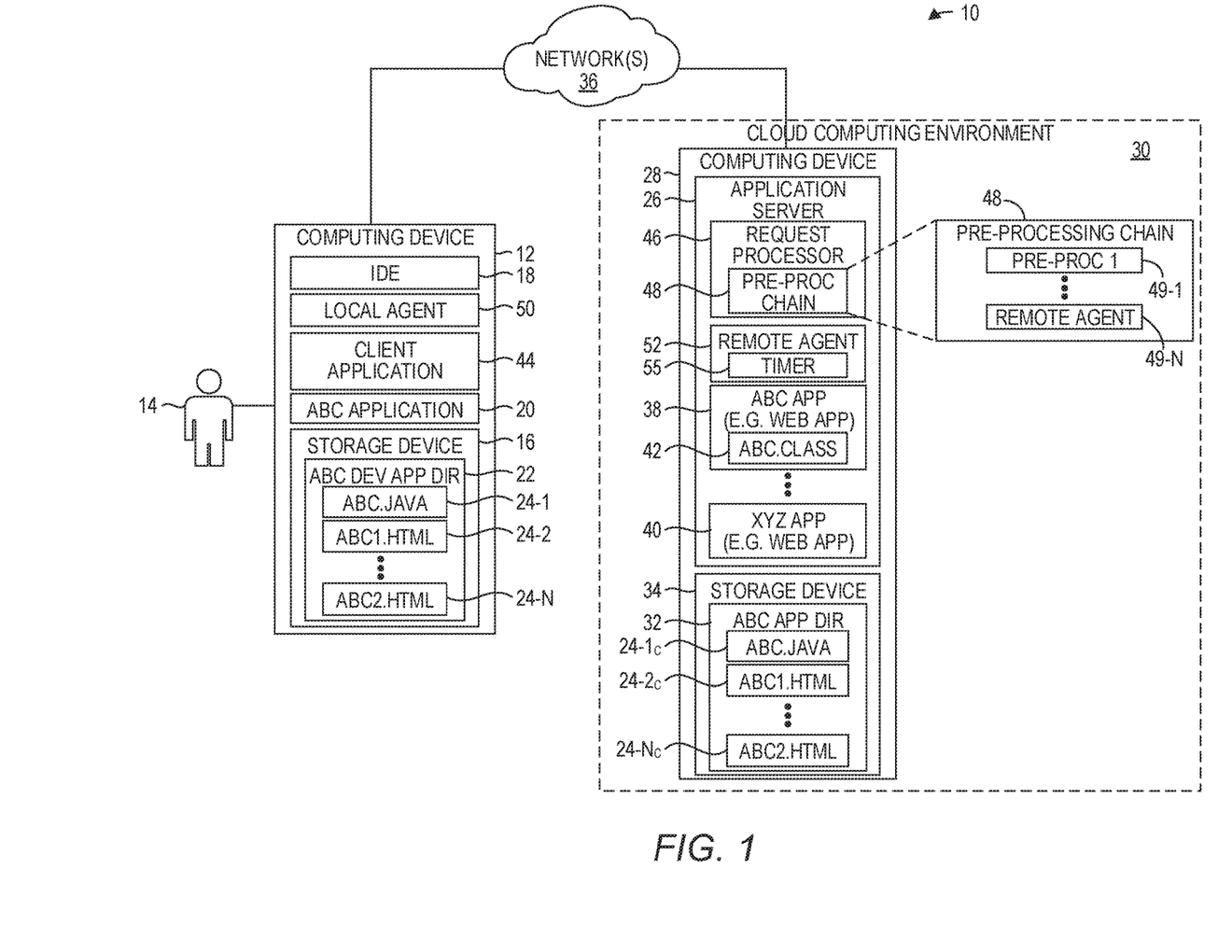
FIG. 1 is a block diagram illustrating an environment in which examples may be practiced.

FIG. 1 is a block diagram illustrating an environment 10 in which examples may be practiced. The environment 10 includes a computing device 12 that is utilized by a user 14 (such as a developer) to develop (and/or maintain) applications. The computing device 12 may be a workstation, a laptop computer, or the like, with hardware components such as a processor device (not illustrated), a memory (not illustrated), and a storage device 16. The user 14 interacts with an integrated development environment (IDE) 18 to develop, or maintain, an application 20 (e.g., ABC application) that executes on an application server. The IDE 18 may comprise any IDE for developing applications in any development environment, but in one example, the IDE 18 comprises a Java IDE for developing Java applications. As the user 14 develops the application 20, the IDE 18 maintains in the storage device 16 one or more directories 22 of files 24-1-24-N (generally, files 24) that make up the application 20. It will be appreciated that the number of files 24 may differ depending on the particular application 20 being developed by the user 14. For example, there may be tens, hundreds, or even thousands of different files 24 that make up the application 20. The files 24 may include, by way of non-limiting example, Hypertext Markup Language (HTML) files, Javascript files, source code files, bytecode files, executable files, image files, video files, audio files, configuration files, and the like.

At some point, the user 14 chooses to install the application 20 on an application server 26 that executes on a computing device 28. In some examples, the application server 26 may be part of a private or public cloud computing environment 30. The computing device 28 may be one of hundreds or thousands of computing devices in the cloud computing environment 30. The installation of the application 20 includes the copying of the files 24 to a corresponding application directory 32 on a storage device 34 communicatively coupled to the computing device 28. While shown as part of the computing device 28 for purposes of simplicity, in other examples the storage device 34 may be physically separate from the computing device 28 and accessible by the computing device 28 via one or more networks 36. The files 24 are copied as files 24-$1_C$-24-$N_C$ (generally, files $24_C$) onto the storage device 34.

The user 14 then causes the application server 26 to initiate or load an application 38 based on the files $24_C$. Thus, the application 38 is the runtime version of the application 20 being developed on the computing device 12. In some examples, the application 38 may be one of multiple applications 38, 40 that execute on the application server 26. In the context of a Java application, the initiation of the application 38 may involve, for example, the generation of one or more .CLASS files 42 from corresponding .JAVA files of the files $24_C$. For example, the .CLASS file 42 may be a bytecode version of the .JAVA file 24-$1_C$.

After initiation, the application 38 is prepared to service requests from client applications. In this example, the user 14 may execute a client application 44 on the computing device 12 to initiate a request for service to the application 38 executing on the application server 26. In some examples, the application 38 may comprise a web application, and the client application 44 may comprise, for example, a browser, such as Internet Explorer or Safari.

The user 14 initiates a request for service to the application 38 via the client application 44 by, for example, clicking on a SEND button or the like. In some examples, this may involve entering in the client application 44 a uniform resource locator or other address that resolves to the application 38. The client application 44 initiates a request for service to the application server 26. The application server 26 includes a request processor 46 which initially processes the request for service prior to providing the request for service to the application 38.

The application server 26 implements a pre-processing mechanism whereby a pre-processing application can request that the pre-processing application be provided a request for service destined for an application, such as the application 38, prior to the request for service being provided to the application 38. The particular pre-processing mechanism for implementing such pre-processing applications may differ depending on the application server 26 being used. In one example, pre-processing applications register with the application server 26, or are pre-configured into the application server 26. Any such pre-processing applications may be identified in a pre-processing chain 48 that comprises one or more pre-processor references 49-1-49-N (generally, pre-processor references 49). Upon receipt of a request for service, the request processor 46 may provide the request for service to each pre-processing application identified in the pre-processing chain 48. Each pre-processing application may perform certain actions and then indicate to the request processor 46 that the request processor 46 can provide the request for service to the next pre-processing application identified in the pre-processing chain 48 or can provide the request for service to the application if there are no more pre-processing applications identified in the pre-processing chain 48. While the precise pre-processing mechanism may differ depending on the design of the application server 26, in one example, the application server 26 comprises a Red Hat Jboss WildFly application server, and the pre-processing mechanism comprises an Undertow specific interface named io.undertow.server.HttpHandler.

After the request processor 46 has provided the request for service from the client application 44 to each pre-processing application identified in the pre-processing chain 48, the request processor 46 provides the request for service to the application 38. The application 38 then processes the request for service and generates and sends a response to the client application 44 for presentation to the user 14.

During the development stage of the application 20, this process may be repeated tens, hundreds, or thousands of times depending on the complexity of the application 20. The copying of updated files 24 to the storage device 34 and the re-initiation of the application 38 such that the application 38 is utilizing any updated files 24 requires multiple steps and adds substantial time to the development process. Moreover, where the application server 26 is part of a cloud computing environment 30, the user 14 may not be in complete control of the timing, and/or may be required to take additional steps, such as authentication steps and the like, that add even more time to the development process.

The examples disclosed herein implement automatic updating of the application 38 executing on the application server 26. The examples include a local agent 50 that executes on the computing device 12 and a remote agent 52 that executes on the computing device 28. The local agent 50 monitors the files 24 in the storage device 16 for any updates, such as new files 24 that did not previously exist and updated files 24 that have a new creation time timestamp. The remote agent 52 registers with the application server 26 as a pre-processing application, and the application server 26 inserts a pre-processor reference 49-N into the pre-processing chain 48 that refers to the remote agent 52.

The local agent 50 establishes a connection with the remote agent 52. For example, the local agent 50 may, via a WebSocket protocol, establish a bi-directional communication path with the remote agent 52. Information necessary for establishing the connection with the remote agent 52 may, for example, be pre-configured into the local agent 50. In one example, the remote agent 52 receives from the local agent 50 a request to establish the connection. The request may include authentication information, and the remote agent 52 may first verify that the authentication information authenticates the local agent 50. The remote agent 52 may then respond in a suitable manner to establish the connection.

For purposes of illustration, assume that the user 14 updates the file 24-1 using the IDE 18. The local agent 50 periodically, such as every 5 seconds, every 10 seconds, every minute, or any other desired interval, analyzes the directory 22 to identify whether any new files 24 have been created or modified. The local agent 50 determines that the file 24-1 has been updated. For example, the local agent 50 may maintain information, such as creation timestamps of the files 24 that allow the local agent 50 to determine whether a file 24 has been updated.

The user 14 then sends, via the client application 44, a request for service that is directed to the application 38. The application server 26 receives the request for service. Prior to providing the request for service to the application 38, the request processor 46 accesses the pre-processing chain 48 and successively provides the request for service to each pre-processing application referred to in the pre-processing chain 48. Ultimately, based on the pre-processor reference 49-N, the request processor 46 provides the request for service to the remote agent 52.

The remote agent 52 determines that the local agent 50 has established a connection with the remote agent 52. The remote agent 52 sends a message to the local agent 50 that requests whether the local agent 50 has any updated files 24 associated with the application 38. The local agent 50 sends the updated file 24-1 to the remote agent 52. The remote agent 52 then updates the application 38 to utilize the updated file 24-1. Various mechanisms by which the application 38 may be updated to utilize the updated file 24-1 will be discussed below. The remote agent 52 then informs the request processor 46 that the application 38 may be provided the request for service. The request processor 46 provides the request for service to the application 38. The application 38 then processes the request for service and generates and sends a response to the client application 44 for presentation to the user 14. The user 14 can then determine whether the updated file 24-1 implemented the desired changes or not. Note that the transfer of the file 24-1 to the application server 26 and the installation of the updated file 24-1 for use by the application 38 happened without human input, manipulation, or involvement, and thus reduced both the effort to test the updated file 24-1 as well as the timeframe to test the updated file 24-1.

In some examples, the remote agent 52 may ensure that the remote agent 52 does not send multiple requests for new files to the local agent 50 within a predetermined period of time. This may be useful, for example, where the application 38 is a web application because the loading of a web page can result in multiple HTTP requests in a relatively short period of time. Thus, in one example, when the remote agent 52 receives the request for service from the request processor 46, the remote agent 52 sets a timer 55. The timer 55 may be set to any desired period of time, such as any number of seconds between 1 second and 60 seconds, or even longer. If the remote agent 52 receives, from the request processor 46, another indication that a request for service has been received, the remote agent 52 determines whether the timer 55 has expired or not. If not, the remote agent 52 informs the request processor 46 that the application 38 may receive the request for service, and the remote agent 52 will not request whether the local agent 50 has any updated files associated with the application 38.

Figure 2:
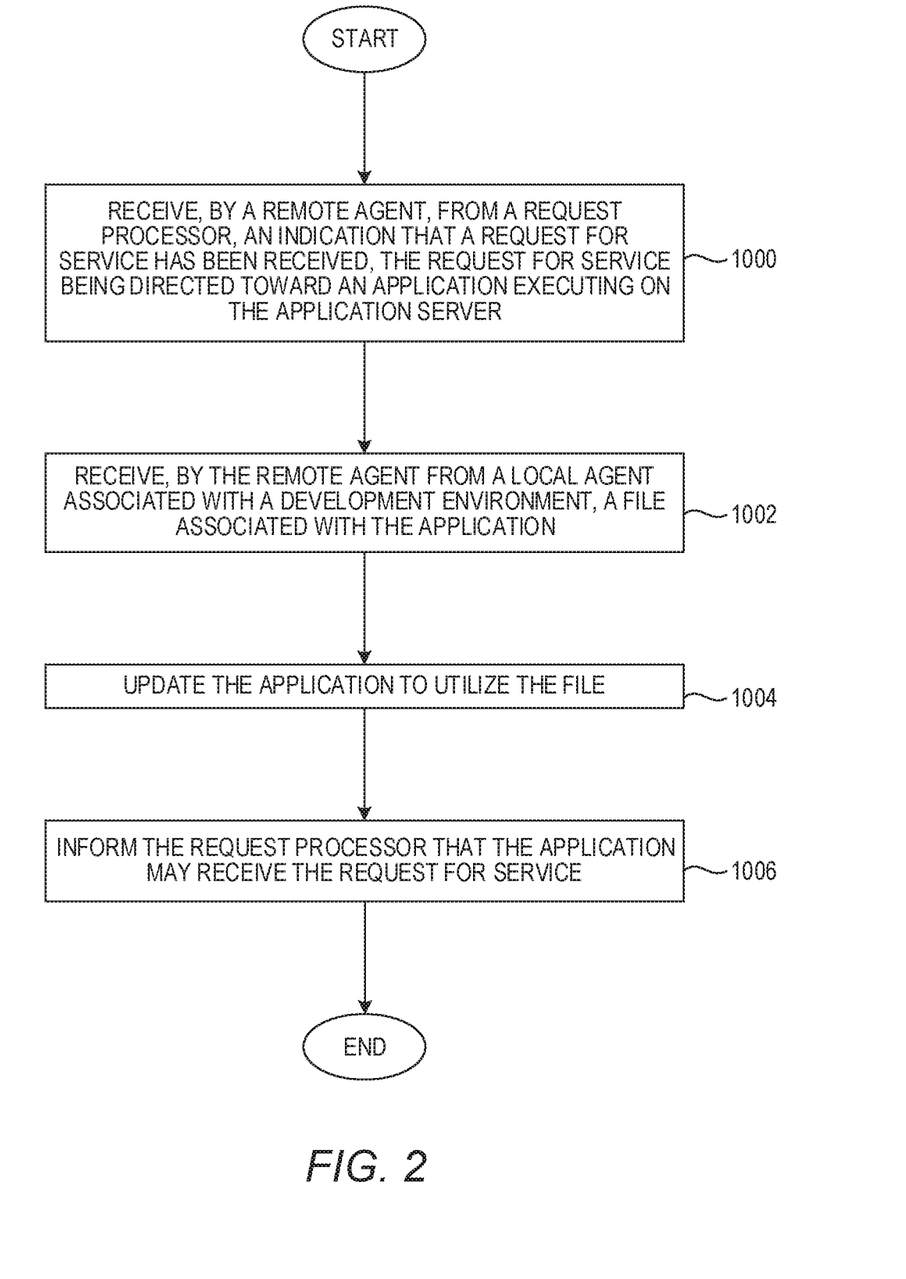
FIG. 2 is a flowchart of a method for automatic updating of an application executing on an application server according to one example.

FIG. 2 is a flowchart of a method for automatic updating of an application executing on an application server according to one example. The remote agent 52 receives, from the request processor 46, an indication that a request for service has been received, the request for service being directed toward the application 38 executing on the application server 26 (FIG. 2, block 1000). In some examples, the indication may comprise the actual request for service. The remote agent 52 receives from the local agent 50 associated with the IDE 18, the file 24-1 associated with the application 38 (FIG. 2, block 1002). The remote agent 52 updates the application 38 to utilize the file 24-1 (FIG. 2, block 1004). The remote agent 52 informs the request processor 46 that the application 38 may receive the request for service (FIG. 2, block 1006).

Figure 3:
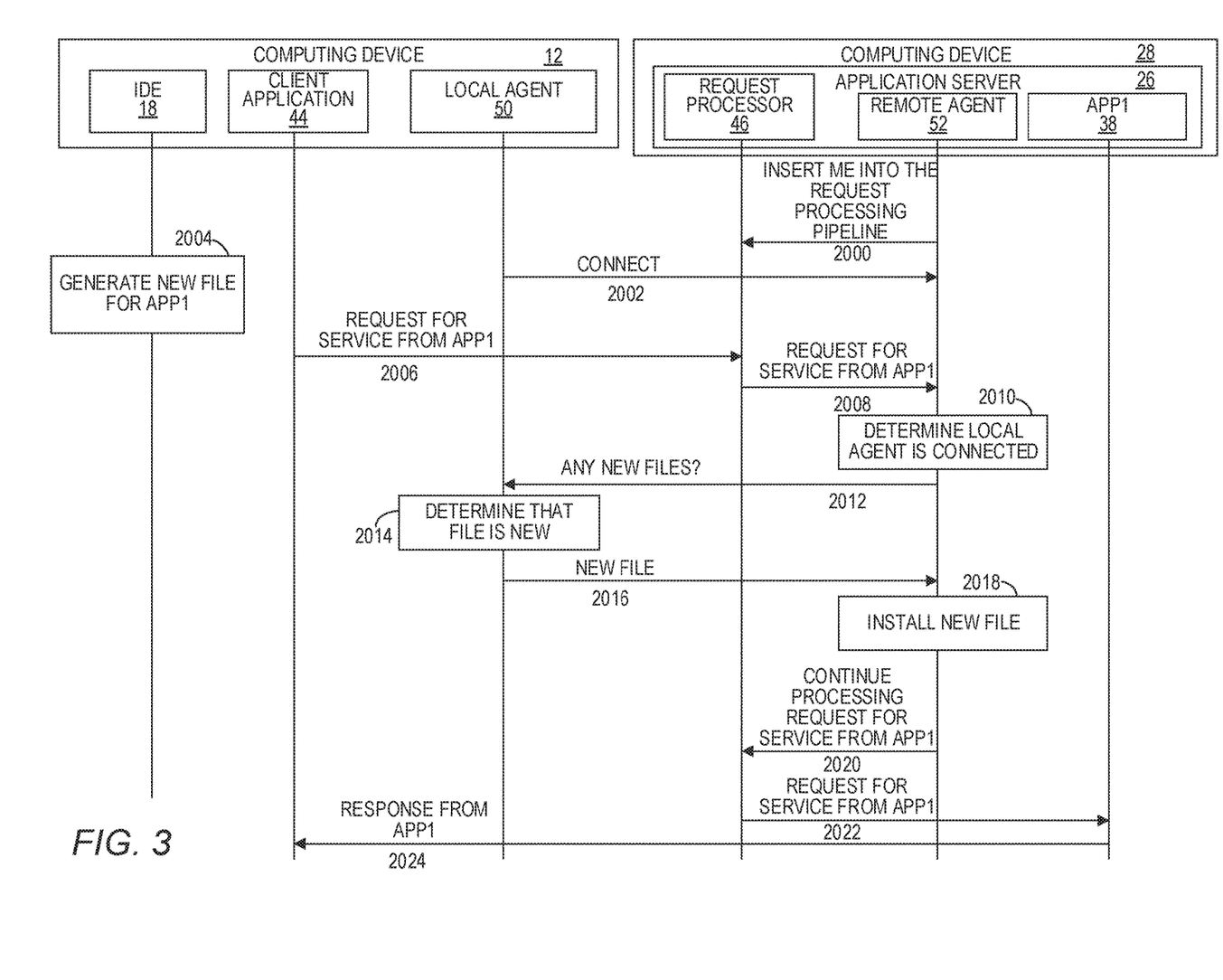
FIG. 3 is a message flow diagram illustrating messaging between various components of the environment illustrated in FIG. 1 and processing implemented by the various components according to some examples.

FIG. 3 is a message flow diagram illustrating messaging between various components of the environment 10 and processing implemented by the various components according to some examples. The remote agent 52 sends a request to the request processor 46 to insert the remote agent 52 into the request processing pipeline (step 2000). This may occur, for example, when the remote agent 52 initializes. As discussed above with regard to FIG. 1, this mechanism for being inserted into the request processing pipeline of the request processor 46 may differ depending on the particular application server 26. In the example where the application server 26 comprises a Red Hat Jboss WildFly application server, the process may involve the use of the Undertow specific interface named io.undertow.server.HttpHandler. However, the examples are not limited to any particular application server architecture and have applicability in any application server environment that allows applications to pre-process requests for service that are sent to the application server.

The local agent 50 connects to the remote agent 52 (step 2002). This may be implemented via any suitable inter-process communication mechanism, such as web sockets, an application programming interface, or the like. The user 14, via the IDE 18, generates a new file 24 (step 2004). The user 14, via the client application 44, causes a request for service from the client application 44 to be sent toward the application 38 (step 2006). The request processor 46 provides the request for service to the remote agent 52 prior to sending the request for service to the application 38 (step 2008). The remote agent 52 determines that the local agent 50 has connected to the remote agent 52 (step 2010). Based on this determination, the remote agent 52 sends the local agent 50 a message requesting any new files created or updated in the development environment with which the local agent 50 is associated (step 2012). The local agent 50 scans the development environment directory 22 (FIG. 1) and determines that a new file 24 exists (step 2014). The local agent 50 sends the new file 24 to the remote agent 52 (step 2016). The remote agent 52 installs the new file 24 in a manner that will cause the application 38 to utilize the new file when the request for service is passed to the application 38 (step 2018). The manner in which the remote agent 52 installs the new file 24 may differ depending on the particular application server 26, the application 38, and/or the type of file 24. For example, in some application servers 26, the remote agent 52 may direct the application server 26 to terminate the application 38 and re-initialize the application 38. In other application servers 26, the remote agent 52 may terminate the application server 26 and re-initialize the application server 26. In some systems, and based on the type of the new file 24, the remote agent 52 may simply copy the new file 24 on top of the previous version of the file 24 to replace the previous version with the new version.

The remote agent 52 then indicates to the request processor 46 that the request processor 46 can continue processing the request for service (step 2020). The request processor 46 sends the request for service to the application 38 (step 2022). The application 38 processes the request for service using the new file 24, and generates and sends a response to the client application 44 (step 2024).

Figure 4:
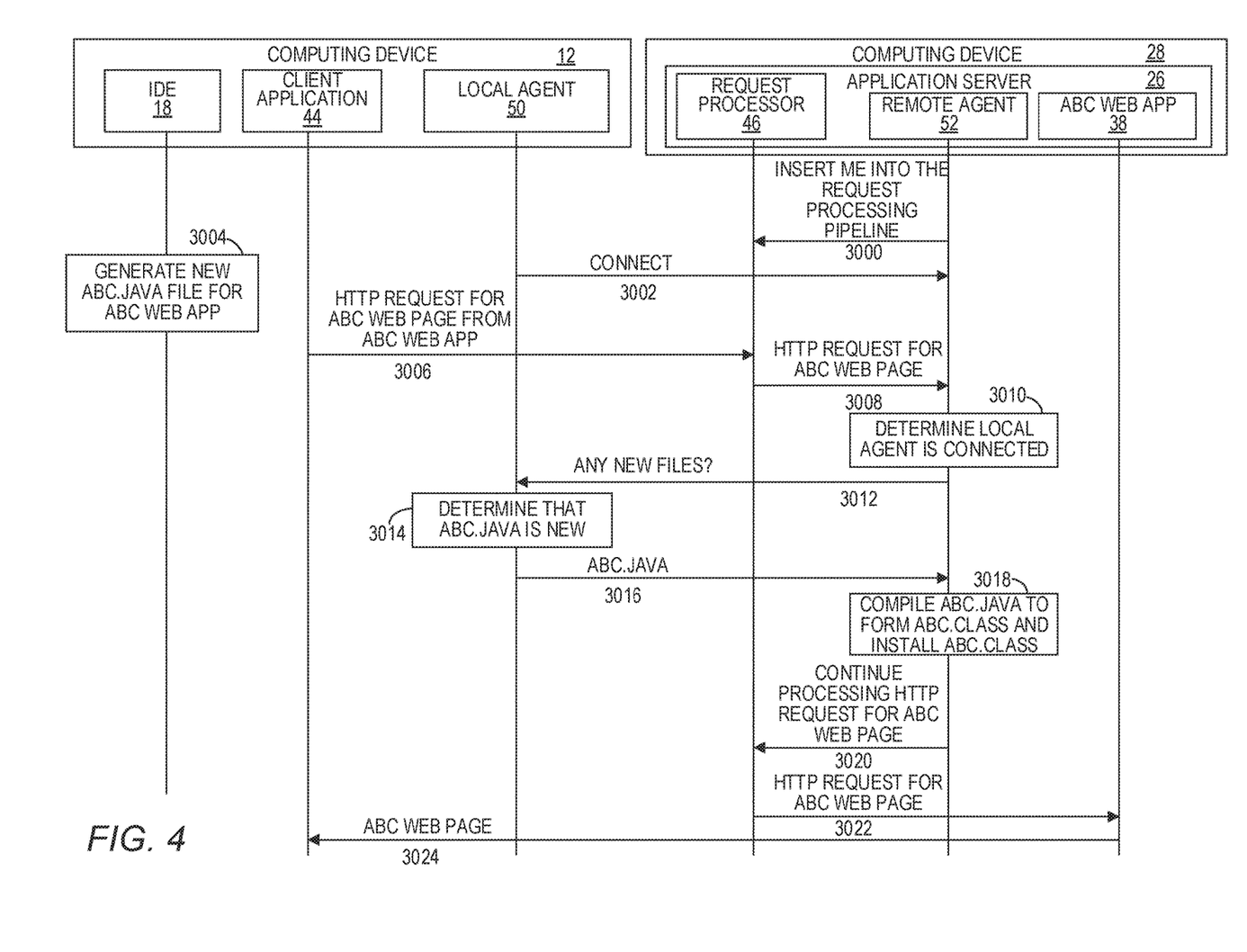
FIG. 4 is a message flow diagram illustrating messaging between various components of the environment illustrated in FIG. 1 and processing implemented by the various components according to additional examples.

FIG. 4 is a message flow diagram illustrating messaging between various components of the environment 10 illustrated in FIG. 1 and processing implemented by the various components according to additional examples. The message flow diagram is substantially similar to that illustrated in FIG. 3, except in this example, the application 38 is a web application, such as a Java machine (JVM) web application. The steps 3000-3002 are substantially similar to steps 2000-2002 of FIG. 3. At step 3004, the user 14 via the IDE 18 generates a new ABC.JAVA file 24 for the application 38. The user 14 then, via the client application 44, which in this example is a browser that utilizes the HTTP protocol, initiates a request for a web page from the application 38 that utilizes the ABC.JAVA file 24 (step 3006). Steps 3008-3016 are substantially similar to steps 2008-2016 of FIG. 3. At step 3018, the remote agent 52 determines that the ABC.JAVA file 24 is a type JAVA file and compiles the ABC.JAVA file 24 to form an ABC.CLASS bytecode file. The remote agent 52 then installs the ABC.CLASS bytecode file into the application 38 using, for example, Fakereplace (available at github.com/fakereplace/fakereplace) or Spring Loaded (available at github.com/spring-projects/spring-loaded). The remaining steps 3020-3024 are substantially similar to steps 2020-2024 of FIG. 3.

Figure 5:
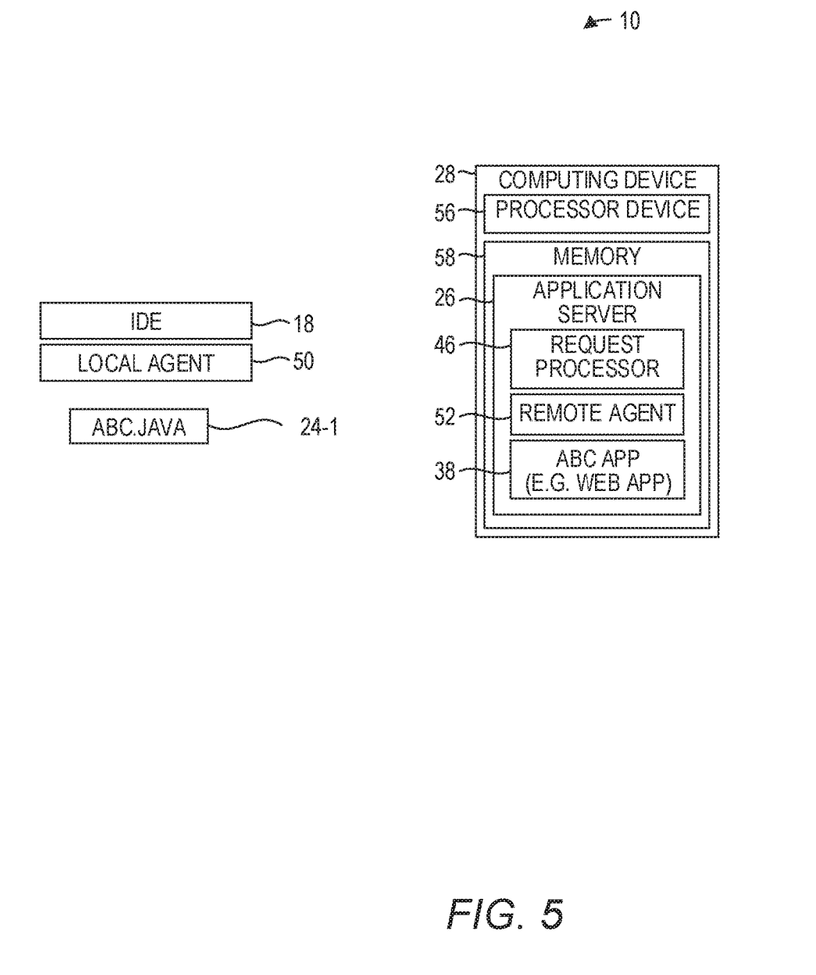
FIG. 5 is a simplified block diagram of the environment illustrated in FIG. 1 according to another example.

FIG. 5 is a simplified block diagram of the environment 10 illustrated in FIG. 1 according to another example. The computing device 28 includes a processor device 56 that is coupled to a memory 58. The processor device 56 is to receive, by the remote agent 52, from the request processor 46, an indication that a request for service has been received. The request for service is directed toward the application 38 executing on the application server 26. It should be noted that for purposes of illustration the remote agent 52 and the request processor 46 are illustrated as separate components that execute in conjunction with the application server 26. However, it should be noted that the examples can be implemented in any number of different architectures, and for example, in some examples the functionality of the remote agent 52 and the request processor 46 are integrated into the application server 26, while in other examples, the functionality of the remote agent 52 and the request processor 46 may be implemented separately from the application server 26.

The processor device 56 is further to receive, via the remote agent 52 from the local agent 50 associated with the IDE 18, the file 24-1 associated with the application 38. The processor device 56 is further to update the application 38 to utilize the file 24-1 and inform the request processor 46 that the application 38 may receive the request for service.

Figure 6:
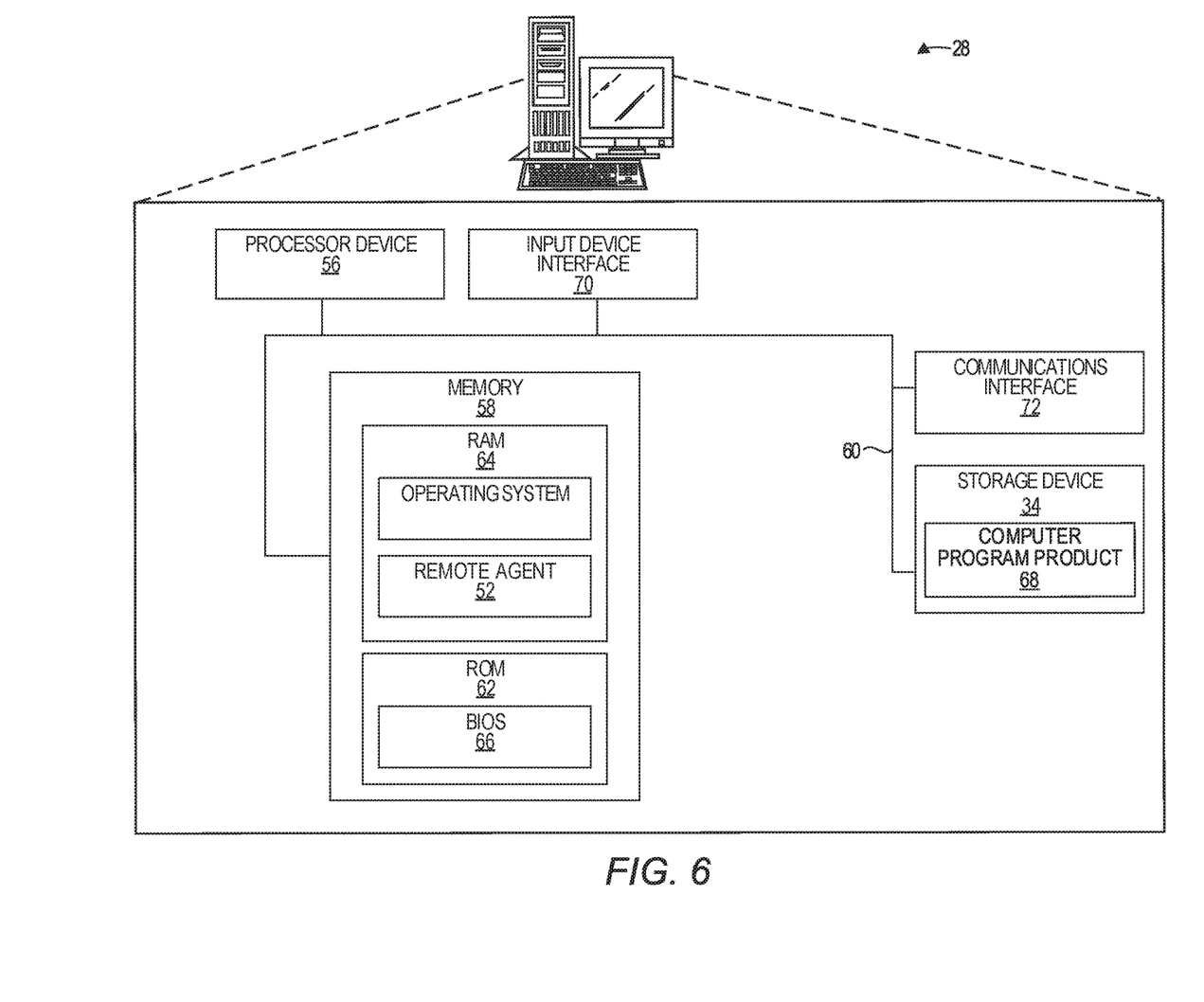
FIG. 6 is a block diagram of a computing device illustrated in FIG. 1 in greater detail according to one example.

FIG. 6 is a block diagram of the computing device 28 in greater detail according to one example. The computing device 28 may comprise any computing or electronic device capable of including firmware, hardware, and/or executing software instructions to implement the functionality described herein, such as a virtual machine, a computer server, a laptop computing device, or the like. The computing device 28 includes the processor device 56, the memory 58, and a system bus 60. The system bus 60 provides an interface for system components including, but not limited to, the memory 58 and the processor device 56. The processor device 56 can be any commercially available or proprietary processor.

The system bus 60 may be any of several types of bus structures that may further interconnect to a memory bus (with or without a memory controller), a peripheral bus, and/or a local bus using any of a variety of commercially available bus architectures. The memory 58 may include non-volatile memory 62 (e.g., read-only memory (ROM), erasable programmable read-only memory (EPROM), electrically erasable programmable read-only memory (EEPROM), etc.), and volatile memory 64 (e.g., random-access memory (RAM)). A basic input/output system (BIOS) 66 may be stored in the non-volatile memory 62 and can include the basic routines that help to transfer information between elements within the computing device 28. The volatile memory 64 may also include a high-speed RAM, such as static RAM, for caching data.

The computing device 28 may further include or be coupled to a non-transitory computer-readable storage medium such as the storage device 34, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 34 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 34 and in the volatile memory 64, including an operating system and one or more program modules, such as the remote agent 52, which may implement the functionality described herein in whole or in part in conjunction with the local agent 50.

All or a portion of the examples may be implemented as a computer program product 68 stored on a transitory or non-transitory computer-usable or computer-readable storage medium, such as the storage device 34, which includes complex programming instructions, such as complex computer-readable program code, to cause the processor device 56 to carry out the steps described herein. Thus, the computer-readable program code can comprise software instructions for implementing the functionality of the examples described herein when executed on the processor device 56. The processor device 56, in conjunction with the remote agent 52 in the volatile memory 64, may serve as a controller, or control system, for the computing device 28 that is to implement the functionality described herein.

An operator, such as the user 14, may also be able to enter one or more configuration commands through a keyboard (not illustrated), a pointing device such as a mouse (not illustrated), or a touch-sensitive surface such as a touch-sensitive display device (not illustrated). Such input devices may be connected to the processor device 56 through an input device interface 70 that is coupled to the system bus 60 but can be connected by other interfaces such as a parallel port, an Institute of Electrical and Electronic Engineers (IEEE) 1394 serial port, a Universal Serial Bus (USB) port, an IR interface, and the like.

The computing device 28 may also include a communications interface 72 suitable for communicating with the network 36 as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a remote agent, from a request processor, an indication that a request for service has been received, the request for service being directed toward an application executing on an application server;
receiving, by the remote agent from a local agent associated with a development environment, a file associated with the application;
subsequent to receiving the indication that the request for service has been received, updating, by the remote agent, the application to utilize the file; and
subsequent to updating the application to utilize the file, informing, by the remote agent, the request processor that the application may receive the request for service.

2. The method of claim 1 further comprising:
receiving, by the remote agent from the local agent, a request to establish a connection.

3. The method of claim 2 wherein the request to establish the connection includes authentication information and further comprising:
verifying, by the remote agent, that the authentication information authenticates the local agent.

4. The method of claim 2 wherein the connection comprises a WebSocket.

5. The method of claim 2 further comprising requesting, by the remote agent from the local agent, whether the local agent has any updated files associated with the application.

6. The method of claim 5 further comprising:
setting, by the remote agent, a timer;
receiving, from the request processor, another indication that a request for service has been received;
determining that the timer has not expired; and
informing the request processor that the application may receive the request for service without requesting, by the remote agent from the local agent, whether the local agent has any updated files associated with the application.

7. The method of claim 1 further comprising sending, by the remote agent to the request processor, a request that the request processor send any requests for service directed toward the application to the remote agent.

8. The method of claim 1 wherein the application comprises a web application, and the request for service is a hypertext transport protocol (HTTP) request for a web page from the web application.

9. The method of claim 1 wherein updating the application to utilize the file comprises:
copying the file to a predetermined location;
terminating the application; and
reinitiating the application.

10. The method of claim 1 wherein the file comprises a java class file, and wherein updating the application to utilize the file comprises:
compiling the java class file to generate a new executable java class file; and
replacing an old executable java class file with the new executable java class file.

11. The method of claim 1 wherein receiving the file associated with the application comprises receiving a plurality of files associated with the application, and further comprising:
updating the application to utilize the plurality of files.

12. A computing device, comprising:
a memory; and
a processor device coupled to the memory to:
receive, by a remote agent, from a request processor, an indication that a request for service has been received, the request for service being directed toward an application executing on an application server;
receive, by the remote agent from a local agent associated with a development environment, a file associated with the application;
subsequent to receiving the indication that the request for service has been received, update, by the remote agent, the application to utilize the file; and
subsequent to updating the application to utilize the file, inform, by the remote agent, the request processor that the application may receive the request for service.

13. The computing device of claim 12 wherein the processor is further to receive, by the remote agent from the local agent, a request to establish a connection.

14. The computing device of claim 13 wherein the processor is further to request, by the remote agent from the local agent, whether the local agent has any updated files associated with the application.

15. The computing device of claim 12 wherein the processor is further to send, by the remote agent to the request processor, a request that the request processor send any requests for service directed toward the application to the remote agent.

16. The computing device of claim 12 wherein to update the application to utilize the file, the processor is further to:
copy the file to a predetermined location;
terminate the application; and
reinitiate the application.

17. A computer program product stored on a non-transitory computer-readable storage medium and including instructions to cause a processor device to:
receive, by a remote agent, from a request processor, an indication that a request for service has been received, the request for service being directed toward an application executing on an application server;
receive, by the remote agent from a local agent associated with a development environment, a file associated with the application;
subsequent to receiving the indication that the request for service has been received, update, by the remote agent, the application to utilize the file; and
subsequent to updating the application to utilize the file, inform, by the remote agent, the request processor that the application may receive the request for service.

18. The computer program product of claim 17 wherein the instructions further cause the processor device to receive, by the remote agent from the local agent, a request to establish a connection.

19. The computer program product of claim 18 wherein the instructions further cause the processor device to request, by the remote agent from the local agent, whether the local agent has any updated files associated with the application.

20. The computer program product of claim 17 wherein the instructions further cause the processor device to send, by the remote agent to the request processor, a request that the request processor send any requests for service directed toward the application to the remote agent.

* * * * *